(12) United States Patent
Helles et al.

(10) Patent No.: US 6,639,895 B1
(45) Date of Patent: Oct. 28, 2003

(54) FAULT TOLERANT NETWORK SWITCH

(75) Inventors: Michael A.. Helles, Fairport, NY (US); William E. Mahuson, Webster, NY (US); John J. Peters, Rochester, NY (US)

(73) Assignee: Performance Technologies, Incorporated, Rochester, NY (US)

( * ) Notice: Subject to any disclaimer, the term of this patent is extended or adjusted under 35 U.S.C. 154(b) by 0 days.

(21) Appl. No.: 09/166,489

(22) Filed: Oct. 5, 1998

(51) Int. Cl.[7] .................. G01R 31/08; H04J 3/08; H04L 12/28
(52) U.S. Cl. .................. 370/219; 370/401; 370/501
(58) Field of Search .................. 370/216–223, 370/225, 228, 242, 243, 244, 401, 219, 501; 714/4

(56) References Cited

U.S. PATENT DOCUMENTS

| | | | |
|---|---|---|---|
| 4,228,535 A | 10/1980 | Workman et al. | |
| 4,485,467 A | 11/1984 | Miles et al. | |
| 4,679,186 A | 7/1987 | Lea | |
| 4,853,927 A | 8/1989 | Wenzel | |
| 4,910,733 A | 3/1990 | Sommani et al. | |
| 5,014,261 A | 5/1991 | Shinbashi et al. | |
| 5,046,067 A * | 9/1991 | Kimbrough | 370/110.1 |
| 5,198,808 A | 3/1993 | Kudo | |
| 5,239,537 A | 8/1993 | Sakauchi | |
| 5,377,180 A | 12/1994 | Laurent | |
| 5,390,163 A | 2/1995 | Itoh et al. | |
| 5,398,235 A | 3/1995 | Tsuzuki et al. | |
| 5,408,462 A * | 4/1995 | Opoczynski | 370/220 |
| 5,629,925 A | 5/1997 | Pfeiffer et al. | |
| 5,663,949 A * | 9/1997 | Ishibashi et al. | 370/220 |
| 5,867,499 A * | 2/1999 | Yunten | 370/397 |
| 5,909,427 A * | 6/1999 | Manning et al. | 370/219 |
| H1894 H * | 10/2000 | Fletcher et al. | 460/15 |
| 6,292,463 B1 * | 9/2001 | Burns et al. | 370/216 |
| 6,385,203 B2 * | 5/2002 | McHale et al. | 370/401 |

* cited by examiner

Primary Examiner—Seema S. Rao
Assistant Examiner—Ronald Abelson
(74) Attorney, Agent, or Firm—Stephen B. Salai; Brian B. Shaw; Harter, Secrest & Emery LLP

(57) ABSTRACT

A fault tolerant network switch includes two or more switches units and a highly reliable (i.e., one with no single point of failure) interconnect unit so that during normal operation both switches are actively handling network packets and upon the failure of one of the switch units, another switch unit takes over, ensuring continued normal network operation, with somewhat reduced performance. The failed switch unit can then be replaced and the network returned to its original performance without disturbance to the other switch or the network cable connections.

36 Claims, 6 Drawing Sheets

FAULT TOLERANT NETWORK SWITCH

FIELD OF THE INVENTION

This invention relates to switching devices and, more particularly, to switches for networks of devices such as computers employing Ethernet, fiber channel, Asynchronous Transfer Mode, or other networking technology to provide a degree of fault tolerance.

BACKGROUND OF THE INVENTION

It is well known to connect networks of computing devices such as hosts, printers, servers, etc. with switches that improve network performance by routing packets between pairs of devices that are in communication with each other, rather than over a common medium, which requires all devices to receive all packets.

Switches, such as Ethernet switches, allow simultaneous connections between pairs of devices on a network and greatly improve the bandwidth of a network compared with non-switching techniques, such as hubs which use a physically or logically common medium.

Network switches commonly employed have a relatively small number of ports (4–64), each of which is connected to a single network segment. Since each network segment shares a common access medium, the number of devices on each switch segment is usually kept as small as practical. Where more devices are connected to a network, multiple interconnected switches are commonly used. Typically, the connections between the switches operate at a higher speed than the switch ports to improve network performance.

In a network of the type described above, the failure of a single switch renders the network unavailable to all of the devices connected to that switch. For example, if a network switch fails, all of the devices attached to that switch are disconnected from the network until the switch is replaced. Network switches typically include components such as printed circuit boards, on which logical devices are mounted, power supplies, and other components, the failure of any one of which can render the entire switch inoperable. These so-called single point of failure network interruptions are very disruptive and expensive and improving the reliability of switches has become critically important.

Many general purpose techniques for improving reliability have been applied to network switches. Providing redundant critical components is a commonly used approach and can overcome some of the single point of failure problems. For example, a network switch can be provided with redundant power supplies, cooling systems, and even switching circuits so that, upon the failure of one component, another component is automatically switched into place so that the switch continues to operate. It is a significant disadvantage of redundant fault protection of the type just described that it increases the cost of network switches without improving switching performance. Providing redundant power supplies, for example, involves the cost of providing a second power supply, which is almost never used, together with the circuitry for switching between a failed power supply and the backup power supply. Configuring the network switch so that the failed component can be replaced without interrupting its operation also adds cost and complexity. This type of redundancy is so expensive that its application is not justified except in situations where reliability is sufficiently critical that the excess cost is acceptable.

SUMMARY OF THE INVENTION

It is an object of the present invention to provide a fault tolerant switching arrangement that overcomes some of the disadvantages just mentioned.

The present invention is meant to offer a very cost effective and practical solution for improving reliability in communications, for example, in an Ethernet network.

It is a particular object of the present invention to provide a fault tolerant network switch that includes two or more switches units and a highly reliable (i.e., one with no single point of failure) interconnect unit so that during normal operation both switches are actively handling network packets and upon the failure of one of the switch units, another switch unit takes over, ensuring continued normal network operation, possibly with somewhat reduced performance. The failed switch unit can then be replaced and the network returned to its original performance without disturbance to the other switch or the network cable connections.

Briefly stated and in accordance with a presently preferred embodiment of the invention, a fault tolerant switch comprises two or more switch units, each having a plurality of switched ports and a hub having at least two ports connected to each switched port. Each switch unit is connected to an interconnect unit connecting each network segment to two or more of the hub ports on the two switch units.

In accordance with a particularly preferred embodiment of the invention, a fault tolerant network switch includes a first switching controller having a plurality of switched ports, a first hub connected to one of the plurality of switched ports and a plurality of independently connectable network ports, each connected to the hub, the connectable network ports having two states, a normal state in which one of the network ports is connected to the hub, and a survivor state in which two or more of the network ports are connected to the hub, and a second switching controller having a plurality of switched ports, a second hub connected to one of the plurality of switched ports, and a plurality of independently connectable network ports connected to the hub, the connectable network ports of the second switching controller having two states, a normal state in which one of the network ports is connected to the hub, and a survivor state in which two or more of the network ports are connected to the hub, and a plurality of network connectors, each of which is connected in parallel to the network ports associated with each of the first and second hubs.

In accordance with another aspect of the invention, each of the switch units includes a fault detector for monitoring the operation of the switch unit and, upon a fault, immediately communicating this status information to the fault detector of another switch unit.

In accordance with another aspect of the invention, status information from the fault detector of one of the switch units is used within the same switch unit to change the state of the independently connected network ports.

In accordance with another aspect of this invention, further redundancy is provided by having a third switching controller also having a plurality of switched ports, a third hub connected to one of the plurality of switched ports, and a plurality of independently connectable network ports connected to the third hub, the connectable network ports having two states, a normal state in which one of the networks is connected to the hub, and a survivor state in which two or more of the network ports are connected to the hub.

In accordance with another aspect of the invention, an interconnect unit for connecting a plurality of network switch units to a plurality of network ports includes a first multi-port connector adapted to be connected to a first network switch unit, a second multiport connector adapted to be connected to a second network switch unit, and a plurality of single port network connectors, each of which is connected in parallel to both the first and second connectors, the interconnect unit not including any single component, the failure of which affects more than one network port.

In accordance with a further embodiment of the invention, the interconnect unit includes a plurality of isolation switches, each isolation switch connected to a network port of one of the first and second network switch units by way of one of the multiport connectors, for isolating the network port from the first and second connectors, the isolation switches being configured so that a failure of any isolation switch does not affect any other isolation switch.

In accordance with a still further embodiment of the invention, a network switch unit includes a switching controller having a plurality of switched ports, a two state hub connected to one of the plurality of switched ports and having a plurality of network ports, the hub having two states, a normal state in which one of the network ports is connected to the switched port and a survivor state in which two or more of the network ports are connected to the switched port.

In accordance with another aspect of the invention, the network switch unit includes a fault detector for providing a fault signal upon detecting a fault in the network switch unit.

In accordance with another aspect of the invention, the network switch unit includes a control input for receiving a fault signal from another network switch unit.

In accordance with still another aspect of the invention, the two state hub of a network switch unit are connected to the fault detector of that same network switch unit.

In accordance with yet another aspect of the invention, the hub has a third, failure state, in which none of the network ports is connected to the switched port.

A significant advantage of the fault tolerant network switch is nonstop performance at a modest system price, making fault tolerant network switching an affordable solution for both small and large networks. Unlike conventional fault tolerant implementations, all switch components are active under normal conditions.

The present invention embodies two or more switching units with an interface unit arranged in such a way that none of the cabling is disturbed when a switching unit is replaced. The present invention relates to a fault tolerant switch in which fault tolerance is provided for a single point of failure.

In an embodiment of the fault tolerant switch of the present invention, two identical switch units each detect faults internally and relay the status to the other switch unit.

DETAILED DESCRIPTION OF THE PREFERRED EMBODIMENTS OF THE INVENTION

Figure 1:
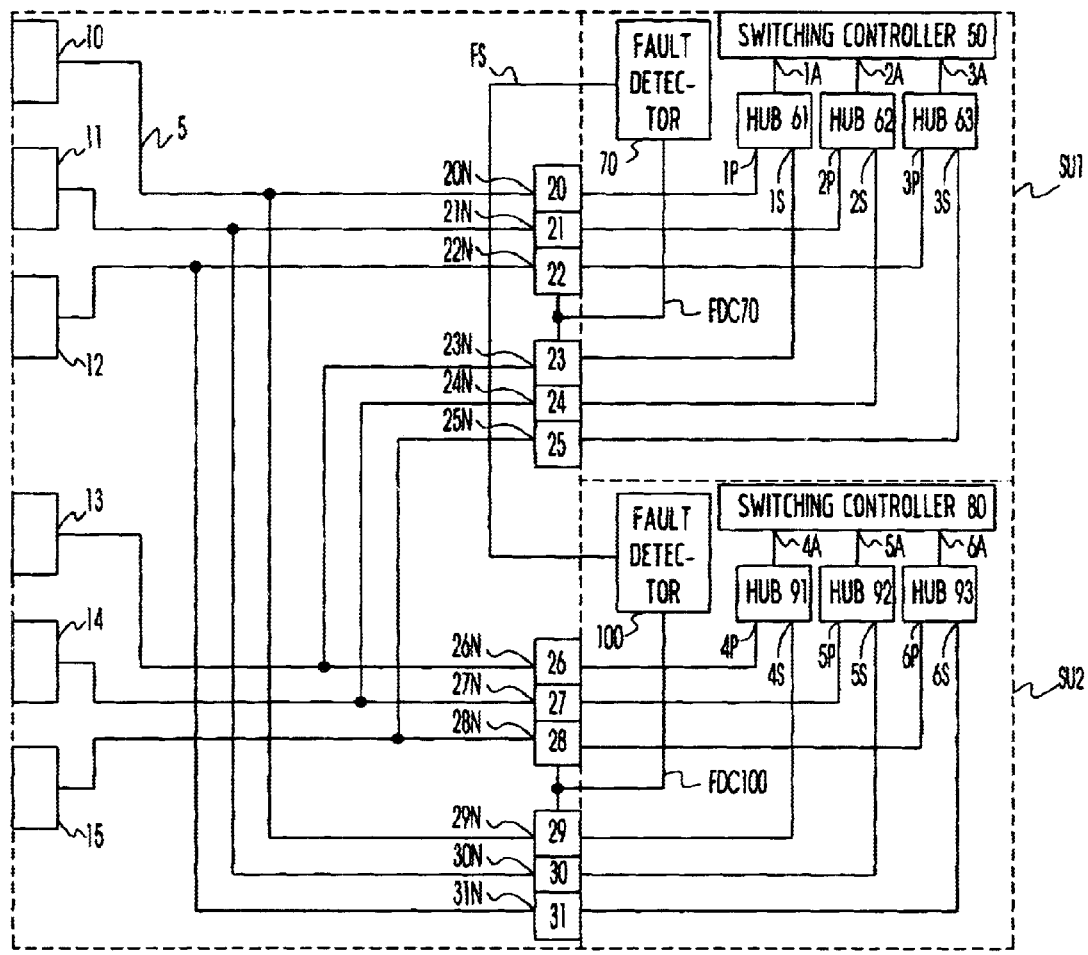
FIG. 1 is a block diagram of a first embodiment of the invention in which two network switch units share a single, integral interconnect unit in which isolation switches are contained within the interconnect unit.

In FIG. 1, a fault tolerant switch includes two network switch units SU1 and SU2 connected to an interconnect box or interface element.

Network switch unit SU1 includes a switching controller 50. The switching controller 50 includes the requisite hardware and software for detecting packets sent by a computing device such as a host connected to one of the ports and delivering each packet to a computing device, such as another host, or a printer or server connected to another port by decoding an address included in the packet and determining the port to which the computing device to which the packet is addressed is connected.

Network switch unit SU1 also includes a fault detector 70 connected each of the switching controller 50, a power supply, a fan, and other components of the network switch unit SU1 the failure of which could cause the network switch unit to cease functioning, so that it is responsive to a fault in any of the components of the network switch unit SU1 to generate a fault signal and can communicate the fault signal to another network switch unit, or use it internally. The fault detector 70 is implemented through a combination of software and hardware. A manual mechanism may be provided per network switch unit to simulate a failure for maintenance purposes.

Network switch unit SU1 also includes hubs 61, 62, 63 connected to the switched ports 1A, 2A, 3A of the switching controller 50. Each hub 61, 62, 63 consists of three bi-directional ports, one port connected to a switched port 1A, 2A, 3A of the switching controller 50 and at least two other ports, primary port IP and secondary port IS. The hub is a shared media element which serves to make the three ports look logically connected. Three hubs are shown, but an actual system would contain between four and 64.

Network switch unit SU2 is substantially identical to network switch unit SU1 and includes a switching controller 80 having ports 4A, 5A, 6A, hubs 91, 92, 93 and fault detector 100.

The interconnect unit IU contains passive interconnect circuitry and isolation switches 20–31 which are preferably relays, solid state switches, or similar devices designed so that no single point of failure will affect more than one network or switch unit port.

While the isolation switches 20–31 are illustrated as part of the switch units SU1 and SU2 in some embodiments of the invention, it will be understood that the switches may form a part of either the switch units or the interconnect unit without affecting the manner in which the invention operates. Line length considerations and the speed of the network connections may require that the isolation switches be located in the interconnect unit, or in the switch unit.

Network ports 20N, 21N, 22N, 23N, 24N, 25N, 26N, 27N, 28N, 29N, 30N, 31N serve as I/O ports of controllable hubs formed from hubs 61, 62, 63, 91, 92, 93 and isolation switches 20–31. Because of the bridging provided by the cabling internal to the interconnect element, there is no single point of failure.

Electrical connections 5 within the interconnect unit IU connect the primary ports 1P, 2P, 3P of the hubs 61, 62, 63 to the network connectors 10, 11, 12 via isolation switches 20, 21, 22 and the secondary ports 1S, 2S, 3S of the hubs 61, 62, 63 to the network connectors 13, 14, 15. Similarly, the interconnect unit IU connects the primary ports 4P, 5P, 6P of the hubs 91, 92, 93 to the network connectors 13, 14, 15 and the secondary ports 4S, 5S, 6S of the hubs to the network connectors 10, 11, 12.

Figure 2:
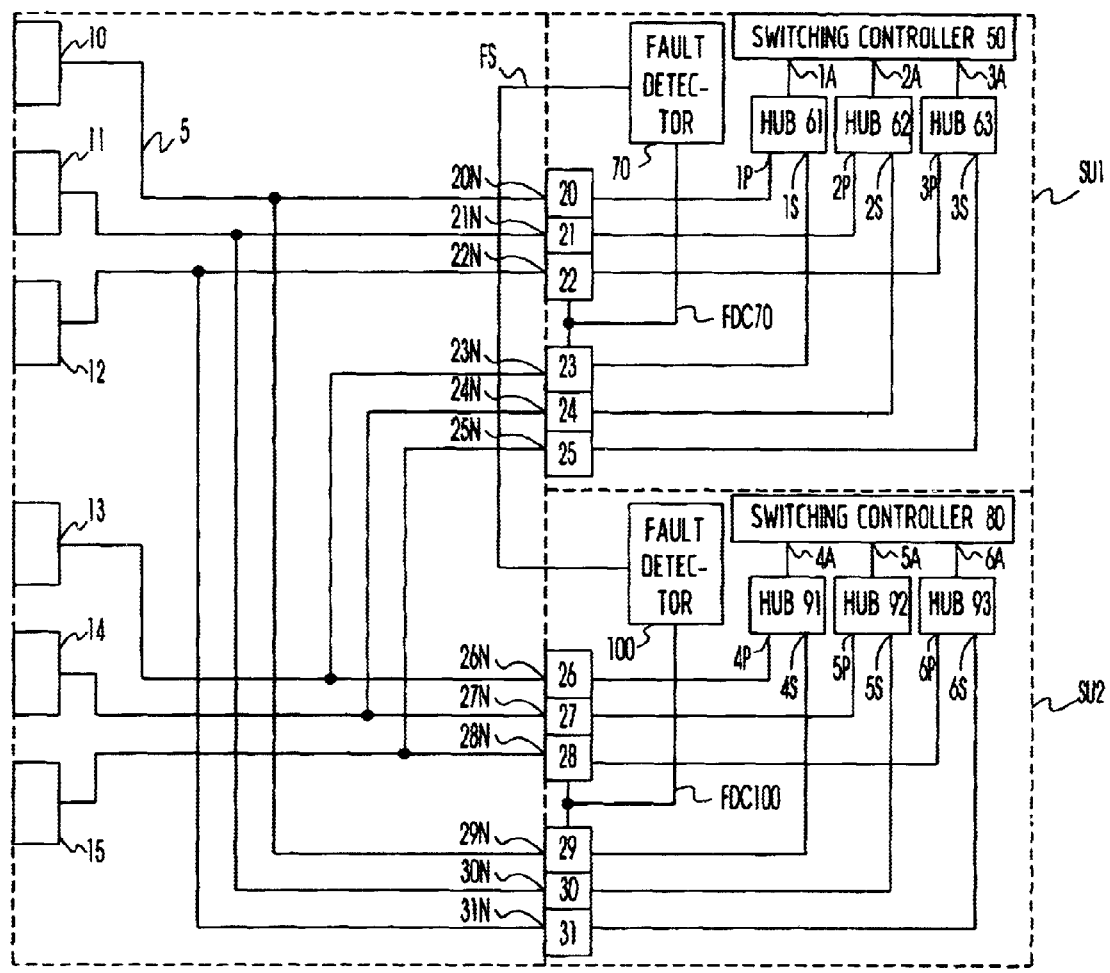
FIG. 2 is a block diagram of a second embodiment in which two network switch units share a single, integral interconnect unit in which isolation switches are contained within the network switch units.

FIG. 2 shows a second embodiment of the present invention. FIG. 2 is the same as FIG. 1 except that the isolation switches 20–31 are now located within their corresponding switch units SU1 or SU2.

Figure 3:
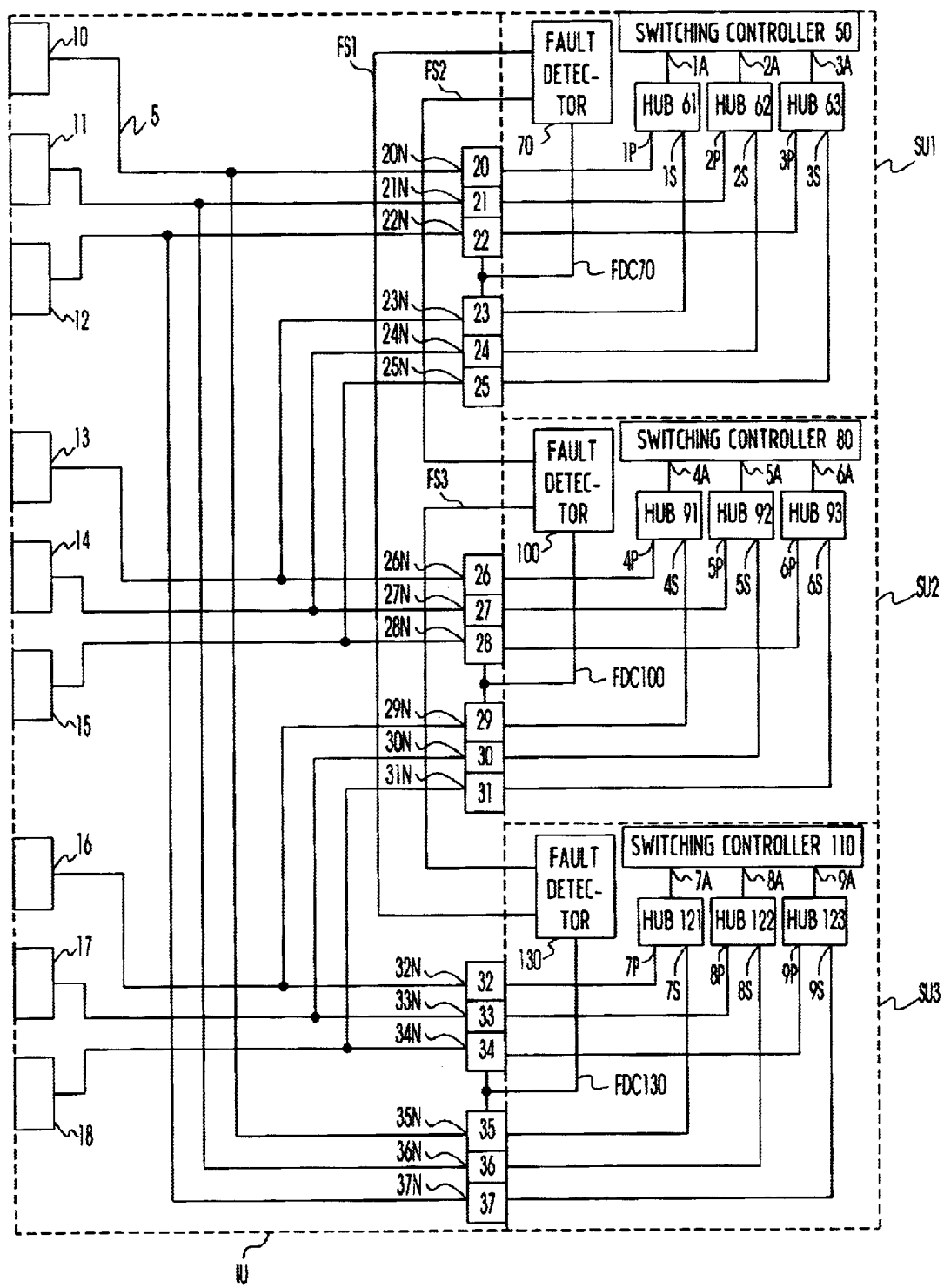
FIG. 3 is a block diagram of a third embodiment in which three network switch units share a single, integral interconnect unit in which isolation switches are contained within the interconnect unit.

FIG. 3 shows a third embodiment in which three network switch units SU1, SU2, SU3 share one interconnect unit IU.

Network switch unit SU3 is similar in structure to network switch units SU1 and SU2 of the prior embodiments. Network switch unit SU3 has a switching controller 110, three hubs 121, 122, 123, network ports 32N, 33N, 34N, 35N, 36N, 37N, and fault detector 130.

The interconnect unit IU of the third embodiment is expanded to include three additional network connectors 16, 17, 18 and a new set of isolation switches 32–37. The interconnect unit IU provides interconnection between network switch unit fault detectors arranged in a daisy chain configuration. Each fault detector is connected to two other fault detectors in a system of one interconnect unit for three or more network switch units.

The embodiment shown in FIG. 3 uses a ring configuration in which each network switch unit has a partner that services the network connectors associated with the network switch unit in the event of a failure. As shown in FIG. 3, the partners are SU1-SU2, SU2-SU3, and SU3-SU1. The failure of the first network switch unit in a partnership will be handled by the second network switch in that same partnership. For example, if network switch unit SU2 fails, the connections will be serviced by SU3.

Figure 4:
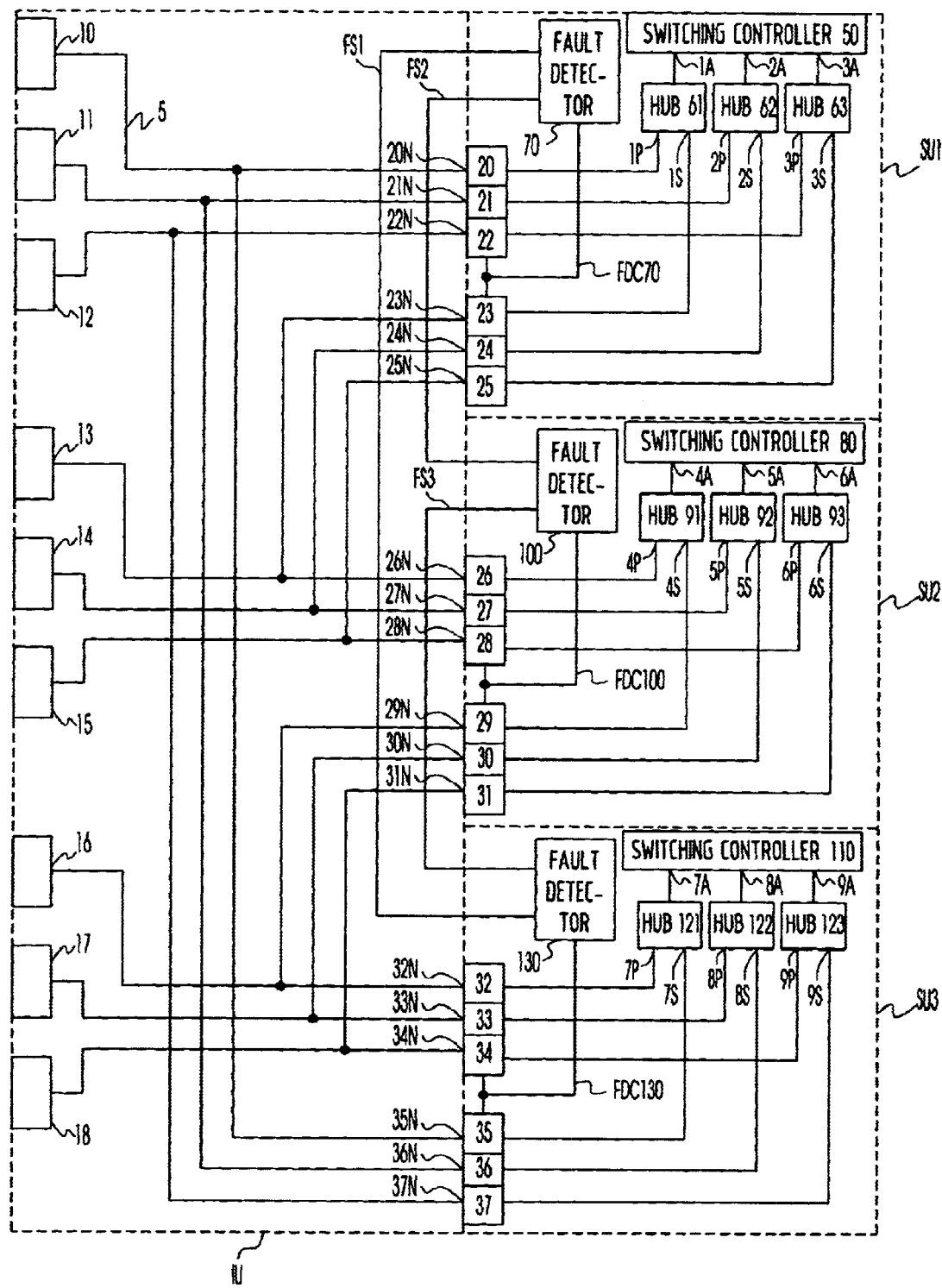
FIG. 4 is a block diagram of a fourth embodiment in which three network switch units share a single, integral interconnect unit in which isolation switches are contained within the network switch units.

FIG. 4 shows a fourth embodiment which is a variant of the third embodiment. In FIG. 4, the isolation switches 20–37 are incorporated into the corresponding network switch unit SU1, SU2, SU3.

Figure 5:
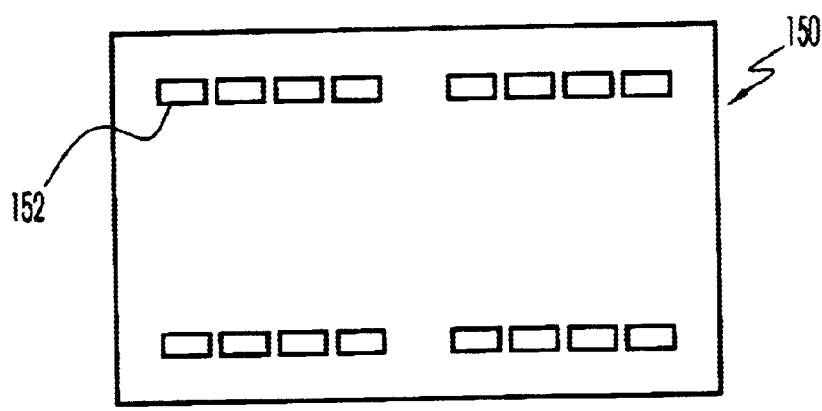
FIG. 5 shows a front view of the interconnect unit.
Figure 6:
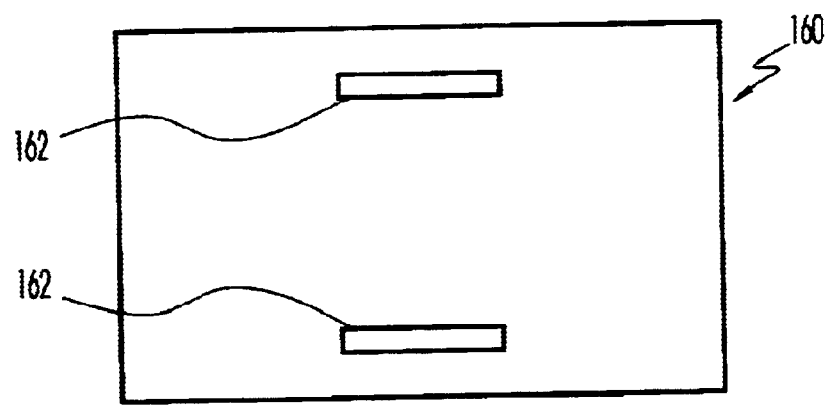
FIG. 6 shows a rear view of the interconnect unit.

FIGS. 5 and 6 show front and back views of a physical implementation of the interconnect unit UI for a two network connectors 152. FIG. 6 shows the rear view 160 of the interconnect unit. There are two multiport connectors 162 which respectively mate to one of the network switch units.

The interconnect unit is arranged so that either one of the network switches can be removed and replaced without disturbing the other switch or any of the single port network connectors. This permits a network to survive a failure in one of the network switches without any interruption in service. When a failure occurs, the failed network switch unit is removed and replaced. During the failure, the other network switch unit services the network connections formerly serviced by the failed network switch unit, and once the failed switch unit is replaced, full switched services are restored.

Figure 7:
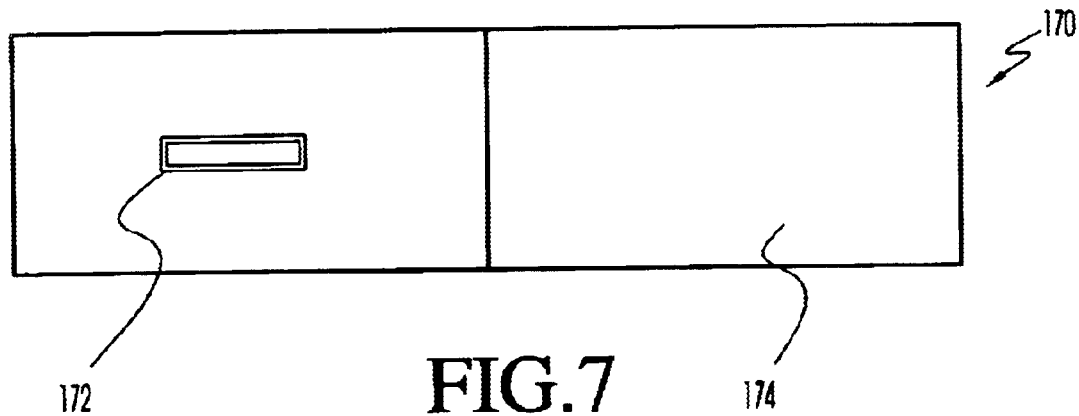
FIG. 7 shows a front panel view of the switch unit without the interconnect unit attached.

FIG. 7 shows a front-side view of the network switch unit 170. The mating connector 172 protrudes out from the recessed receiving surface for the interconnect unit panel. The interconnect unit panel 220 fits so that the front-side is flush with the rest of the front side of the switch unit 174.

Figure 8:
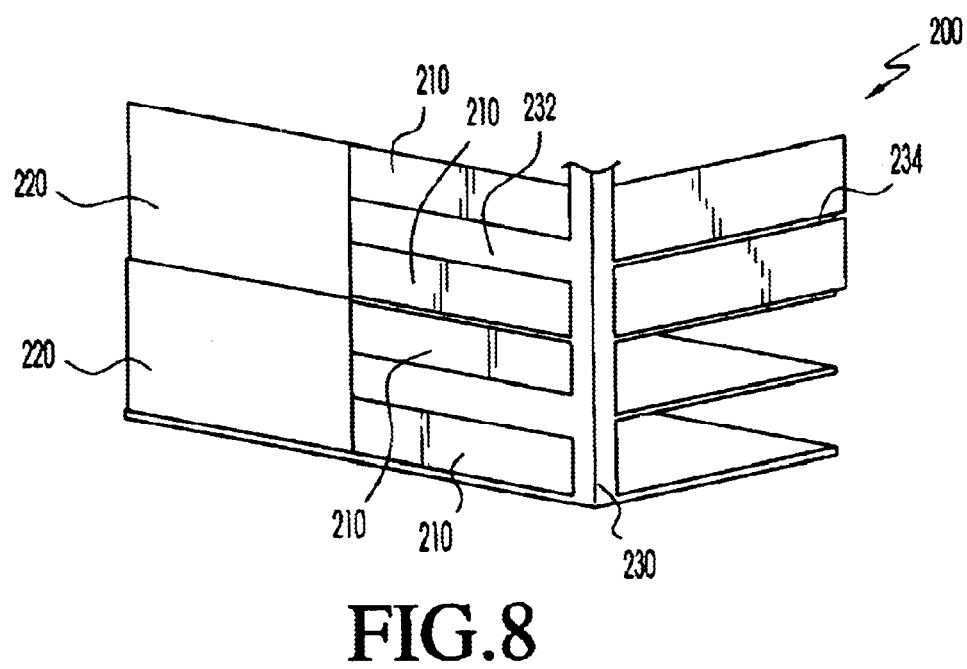
FIG. 8 shows a perspective view of the switch units and interconnect units.

FIG. 8 shows a rack mounted arrangement of four network switch unit housings 210. Two-network-switch-unit interconnect unit panels 220 are each connected to two of the four network switch unit housings 210. The interconnect unit panels 220 are mounted so as part of the rack assembly. Shelves 234 support the individual network switch unit panels 210. Additional support comes from a front panel 232. Corner beams 230 complete the essential supportive structure of the rack mount 200.

The operation of the fault tolerant network switch proceeds generally as follows.

When no fault is present, all network switch units are in the normal state wherein the primary isolation switches are logically closed (i.e., enabled) connecting the primary port of each hub to its respective network port, and the secondary isolation switches are open. The switch units operate independently, each handling packet traffic to and from computing devices located on network segments connected to their primary hub ports. An ongoing periodic communication regarding the fault status of each network switch unit as well as setup and configuration parameters takes place between the switch units by means of their respective fault detectors such that each network switch unit is updated with the fault status and setup and configuration parameters of another switch unit.

In the event a failure is detected in one of the network switch units, for example, network switch unit SU2, a signal FS from the network switch unit SU2's fault detector is used to place network switch unit SU2 in the fault state wherein both the network switch unit SU2's primary isolation switches and the secondary isolation switches are logically open and network switch unit SU2's primary and secondary hub ports are disconnected from their respective network ports. Also, in the event of a failure in network switch unit SU2, communications from network switch unit SU2 to network switch unit SU1 results in network switch unit SU1 entering the survivor state in which both the network switch unit SU1's primary isolation switches and secondary isolation switches are logically closed. The resulting failure-state configuration has network ports 10–12 connected to network switch unit SU1's primary hub ports 1P, 2P, 3P, network ports 13–15 connected to the network switch unit SU1's secondary hub ports 1S, 2S, 3S. Using the setup and failure-state configuration, network switch unit SU1 is able to handle packet traffic to and from network ports 13–15, originally handled by the failed network switch unit SU2, as well as packet traffic to and from network ports 10–12.

In the event that network switch unit SU2 were to fail in a manner that it could not report a failure state to network switch unit SU1, the absence of periodic signals indicating normal operation would trigger survivor mode for network switch unit SU1 while network switch unit SU2 would be in failure mode.

When a fault condition occurs, the defective switch unit can be removed and replaced without interrupting network traffic. Once the defective switch unit is replaced and all switch units are once again operative, as determined by each switch unit's respective fault detector, all switch units return to normal state and the fault tolerant network switch is returned to its original configuration.

While the invention has been described in terms of the preferred embodiments, those skilled in the art will recognize that many modifications and changes may be made therein without departing from the true spirit and scope of the invention which accordingly intended to be defined solely by the appended claims.

What is claimed is:

1. A fault tolerant network switch, comprising:
a first switch having a plurality of switched ports;
a first fault detector associated with the first switch providing a fault signal upon detecting a fault in the first switch;
a first hub connected to one of the plurality of switched ports;
a plurality of independently connectable network ports connected to the first hub and having a control input connected to the first fault detector for receiving the fault signal, the connectable network ports having two states responsive to the fault signal: a normal state in which one of the network ports is connected to the first hub and a survivor state in which two or more of the network ports are connected to the first hub;
a second switch having a second plurality of switched ports;
a second fault detector associated with the second switch providing a fault signal upon detecting a fault in the second switch;
a second hub connected to one of the second plurality of switched ports;
a plurality of independently connectable network ports connected to the second hub and having a control input connected to the second fault detector for receiving the fault signal, the connectable network ports having two states responsive to the fault signal: a normal state in which one of the network ports is connected to the second hub and a survivor state in which two or more of the network ports are connected to the second hub; and
a plurality of network connectors each of which is connected in parallel to the network ports associated with each of the firsthand second hubs.

2. The fault tolerant network switch of claim 1 in which the plurality of independently connectable network ports comprise relays.

3. The fault tolerant network switch of claim 1 in which the independently connectable network ports comprise solid state switches.

4. The fault tolerant network switch of claim 1, wherein the network ports are part of a network selected from the group consisting of Ethernet, fiber channel, token ring, or asynchronous transfer mode.

5. The fault tolerant network switch of claim 1, further comprising:
a switch controller having a plurality of switched ports;
a third hub connected to one of the plurality of switched ports; and
a plurality of independently connectable network ports connected to the hub, the connectable network ports having two states: a normal state in which one of the network ports is connected to the hub and a survivor state in which two or more of the network ports are connected to the hub.

6. The fault tolerant network switch of claim 1, wherein the plurality of independently connectable network ports, the plurality of network connectors, and the connections between the network ports and the network connectors from a unitary interconnect unit.

7. The fault tolerant network switch of claim 2, wherein the network relays and connectors are housed in a single unit.

8. The fault tolerant network switch of claim 1, in which the network connectors, and a multiport connector, adapted to be connected to the plurality of independently connectable network ports, form a unitary interconnect unit.

9. A fault tolerant network switch, comprising:
a first switching controller having a plurality of switched ports;
a first fault detector associated with the first switch providing a fault signal upon detecting a fault in the first switch; a first hub connected to one of the plurality of switched ports of the first switching controller;
a first plurality of independently connectable network ports connected to the first hub and having a control input for receiving the fault signal, the connectable network ports having two states responsive to the fault signal: a normal state in which one of the network ports is connected to the hub and a survivor state in which two or more of the network ports are connected to the hub;
a second switching controller having a plurality of switched ports;
a second fault detector associated with the second switching controller providing a fault signal upon detecting a fault in the second switching controller;
a second hub connected to one of the plurality of switched ports of the second switching controller;
a second plurality of independently connectable network ports connected to the second hub and having a control input for receiving a fault signal, the connectable network ports having two states responsive to the fault signal: a normal state in which one of the network ports is connected to the hub and a survivor state in which two or more of the network ports are connected to the hub;
a plurality of network connectors each of which is connected in parallel to the network ports associated with each of the first and second hubs at least one of the first and second hubs having an additional third state: a failure state in which none of the network ports is connected to the switched port.

10. The fault tolerant network switch of claim 9, in which the first fault detector is connected to the control input of the first plurality of independently connectable network ports.

11. The fault tolerant network switch of claim 9, in which the first fault detector is connected to the control input of the second plurality of independently connectable network ports.

12. A fault tolerant network switch, comprising:
a first switch having a plurality of switched ports;
a first fault detector associated with the first switch providing a fault signal upon detecting a fault in the first switch;
a first hub connected to one of the plurality of switched ports of a first switching controller;
a first plurality of independently connectable network ports comprising an isolation switch connected to the first hub, and having a control input for receiving the fault signal, the connectable network ports having two states responsive to the fault signal: a normal state in which one of the network ports is connected to the hub and a survivor state in which two or more of the network ports are connected to the hub;
a second switch having a plurality of switched ports;
a second hub connected to one of the plurality of switched ports of the second switch;
a second plurality of independently connectable network ports comprising an isolation switch connected to the second hub, and having a control input for receiving a fault signal, the connectable network ports having two states responsive to the fault signal: a normal state in which one of the network ports is connected to the hub and a survivor state in which two or more of the network ports are connected to the hub; and a plurality of network connectors each of which is connected in parallel to the network ports associated with each of the first and second hubs.

13. The fault tolerant network switch of claim 12, wherein the interconnect unit further comprises the isolation switches of the hubs.

14. A fault tolerant network switch, comprising:
a first switch having a plurality of switched ports;
a first fault detector associated with the first switch providing a fault signal upon detecting a fault in the first switch;
a first hub connected to the of the plurality of switched ports;
a first plurality of independently connectable network ports connected to the first hub and having a control input for receiving a fault signal, the first plurality of independently connectable network ports having two states responsive to the fault signal: a normal state in which one of the network ports is connected to the hub and a survivor state in which two or more of the network ports are connected to the hub;
a second switch having a second plurality of switched ports;
a second fault detector associated with the second switch providing a fault signal upon detecting a fault in the second switch;
a second hub connected to one of the second plurality of switched ports;
a second plurality of independently connectable network ports connected to the second hub and having a control input for receiving a fault signal, the second plurality of independently connectable network ports having two states responsive to the fault signal: a normal state in which one of the network ports is connected to the hub and a survivor state in which two or more of the network ports are connected to the hub; and
a plurality of network connectors each of which is connected in parallel to the network ports associated with each of the first and second hubs; wherein the plurality of independently connectable network ports, the plurality of network connectors, and the connections between the network ports and the network connectors form a single integral interconnect unit which mounts to a rack.

15. The fault tolerant network switch of claim 12, wherein the isolation switch is a relay.

16. A fault tolerant network switch, comprising:
a first switch having a plurality of switched ports;
a first fault detector associated with the first switch providing a fault signal upon detecting a fault in the first switch;
a first hub connected to one of the plurality of switched ports of the first switch;
a first plurality of independently connectable network ports connected to the first hub and having a control input for receiving a fault signal, the connectable network ports having two states: a normal state in which one of the network ports is connected to the hub and a survivor state in which two or more of the network ports are connected to the hub;

a second switch having a plurality of switched ports;
a second fault detector associated with the second switch providing a fault signal upon detecting a fault in the second switch;
a second hub connected to one of the plurality of switched ports of the second switch;
a second plurality of independently connectable network ports connected to the second hub and having a control input for receiving a fault signal, the second plurality of independently connectable network ports having two states responsive to the fault signal: a normal state in which one of the network ports is connected to the second hub and a survivor state in which two or more of the network ports are connected to second the hub;
a plurality of network connectors each of which is connected in parallel to the network ports associated with each of the first and second hubs;
further comprising:
a third switch having a plurality of switched ports;
a third hub connected to one of the plurality of switched ports;
a third fault detector providing a fault signal upon detecting a fault in the third switch; and
a third plurality of independently connectable network ports connected to the third hub and having a control input for receiving a fault signal, the third plurality of independently connectable network ports having two states responsive to the fault signal: a normal state in which one of the network ports is connected to the hub and a survivor state in which two or more of the network ports are connected to the hub.

17. A fault tolerant network switch, comprising:
a first switch having a plurality of switched ports;
a first fault detector associated with the first switch providing a fault signal upon detecting a fault in the first switch;
a first hub connected to one of the plurality of switched ports;
a first plurality of independently connectable network ports connected to the first hub and having a control input for receiving a fault signal, the first plurality of independently connectable network ports having two states responsive to the fault signal: a normal state in which one of the network ports is connected to the hub and a survivor state in which two or more of the network ports are connected to the hub;
a second switch having a second plurality of switched ports; a
a second fault detector associated with the second switch providing a fault signal upon detecting a fault in the second switch;
a second hub connected to one of the second plurality of switched ports;
a second plurality of independently connectable network ports connected to the second hub and having a control input for receiving a fault signal, the second plurality of independently connectable network ports having two states responsive to the fault signal: a normal state in which one of the network ports is connected to the hub and a survivor state in which two or more of the network ports are connected to the hub;
a plurality of network connectors each of which is connected in parallel to the network ports associated with each of the first and second hubs; and
wherein each switch and its corresponding fault detector, the switched ports, and the hubs are housed in a single unit.

18. A fault tolerant network switch, comprising:

a first switch having a plurality of switched ports;

a first fault detector associated with the first switch providing a fault signal upon detecting a fault in the first switch;

a first hub connected to one of the plurality of switched ports;

a first plurality of independently connectable network ports connected to the first hub and having a control input for receiving a fault signal, the first plurality of independently connectable network ports having two states responsive to the fault signal: a normal state in which one of the network ports is connected to the hub and a survivor state in which two or more of the network ports are connected to the hub;

a second switch having a plurality of switched ports;

a second fault detector associated with the second switch providing a fault signal upon detecting a fault in the second switch;

a second hub connected to one of the second plurality of switched ports;

a second plurality of independently connectable network ports connected to the second hub and having a control input for receiving a fault signal, the second plurality of independently connectable network ports having two states responsive to the fault signal: a normal state in which one of the network ports is connected to the hub and a survivor state in which two or more of the network ports are connected to the hub; and a plurality of network connectors each of which is connected in parallel to the network ports associated with each of the first and second hubs in which the switch, the switched ports, the hubs, the fault detector, and the independently connectable network ports form a unitary network switch unit.

19. An interconnect unit for connecting a plurality of network switch units to a plurality of network ports, comprising:

a first multiport connector adapted to be connected to a first network switch;

a first fault detector connected to the first network switch and providing a fault signal upon detecting a fault in the switch;

a second multiport connector adapted to be connected to a second network switch;

a second fault detector connected to the second network switch and providing a fault signal upon detecting a fault in the switch;

a plurality of single port network connectors each of which is connected in parallel to both of the first and second multiport connectors;

in which each network switch comprise a control input for receiving a fault signal from a fault detector associated with the other network switch; and the interconnect unit not including any single component the failure of which affects more than one network port.

20. The interconnect unit of claim 19, comprising:

a plurality of isolation switches, each isolation switch adapted to be connected to a network port of the first and second network switch units by way of one of the multiport connectors, for isolating the network port from the first and second connectors, the isolation switches being configured so that a failure of any isolation switch does not affect any other isolation switch.

21. An interconnect unit for connecting a plurality of network switch units to a plurality of network ports, comprising:

a first multiport connector adapted to be connected to a first network switch unit;

a first fault detector connected to the first network switch and providing a fault signal upon detecting a fault in the switch;

a second multiport connector adapted to be connected to a second network switch unit;

a second fault detector connected to the second network switch and providing a fault signal upon detecting a fault in the switch;

a plurality of single port network connectors each of which is connected in parallel to both of the first and second multiport connectors;

the interconnect unit not including any single component the failure of which affects more than one network port; and a plurality of isolation switches, each isolation switch adapted to be connected to a network port of the first and second network switch units by way of one of the multiport connectors, for isolating the network port from the first and second connectors; and including a control input for receiving a fault signal from a fault detector the isolation switches being configured so that a failure of any isolation switch does not affect any other isolation switch.

22. The interconnect unit of claim 20, in which the isolation switch is a solid state switch.

23. The interconnect unit of claim 19, in which the interconnect unit is a single, integral unit.

24. The interconnect unit of claim 23, in which the interconnect unit includes supports for supporting the first and second network switch units.

25. An interconnect unit for connecting a plurality of network switch units to a plurality of network ports, comprising:

a first multiport connector adapted to be connected to a first network switch unit;

a second multiport connector adapted to be connected to a second network switch unit;

a plurality of single port network connectors each of which is connected in parallel to both of the first and second connectors;

the interconnect unit not including any single component the failure of which affects more than one network port; and a plurality of isolation switches, each isolation switch adapted to be connected to a network port of the first and second network switch units by way of one of the multiport connectors, for isolating the network port from the first and second connectors, the isolation switches being configured so that a failure of any isolation switch does not affect any other isolation switch in which power for operating the isolation switches comes from the first and second network switch units.

26. An interconnect unit for connecting a plurality of network switch units to a plurality of network ports, comprising:

first and second fault detectors connected to the first and second network switches respectively, each fault detector providing a fault signal upon detecting a fault in the switch;

a first multiport connector disposed on a first major opposing surface of the interconnect unit adapted to be connected to a first network switch;

a second multiport connector disposed on a first major opposing surface of the interconnect unit adapted to be connected to a second network switch;

a plurality of single port network connectors each of which is connected in parallel to both of the first and second connectors; and including a control input for receiving a fault signal from a fault detector; and the interconnect unit not including any single component the failure of which affects more than one network port.

27. The interconnect unit of claim 26, wherein a plurality of network ports are disposed on a second major opposing surface of the interconnect unit.

28. An interconnect unit for connecting a plurality of network switch units to a plurality of network ports, comprising:

a first multiport connector adapted to be connected to a first network switch unit;

a second multiport connector adapted to be connected to a second network switch unit;

a plurality of single port network connectors each of which is connected in parallel to both of the first and second connectors;

the interconnect unit not including any single component the failure of which affects more than one network port; and in which one of the first and second network switch units can be disconnected from the interconnect unit and replaced without disturbing the other of the first and second network switch units or connections to the network connectors.

29. A network switch unit comprising:

a switch having a plurality of switched ports and a fault detector connected to the and providing a fault signal upon detecting a fault in the switch;

a two-state hub connected to one of the plurality of switched ports and having a plurality of network ports and a control input for receiving a fault signal from a fault detector, the hub having two states: a normal state in which one of the network ports is connected to the switched port and a survivor state entered in response to the fault signal in which two or more of the network ports are connected to the switched port.

30. The network switch unit of claim 29, comprising a fault detector for providing a fault signal upon detecting a fault in the network switch unit.

31. The network switch unit of claim 30, comprising a control input for receiving a fault signal.

32. A network switch unit comprising:

a switching controller having a plurality of switched ports; and a two-state hub connected to one of the plurality of switched ports and having a plurality of network ports, the hub having two states: a normal state in which one of the network ports is connected to the switched port and a survivor state in which two or more of the network ports are connected to the switched port, comprising a fault detector for providing a fault signal upon detecting a fault in the network switch unit, comprising a control input for receiving a fault signaling which the control input is connected to the two-state hub so that a fault signal from another switch unit controls the state of the two-state hub.

33. A network switch unit comprising:

a switch having a plurality of switched ports;

a two-state hub connected to one of the plurality of switched ports and having a plurality of network ports, the hub having two states: a normal state in which one of the network ports is connected to the switched port and a survivor state in which two or more of the network ports are connected to the switched port; and a fault detector for providing a fault signal upon detecting a fault in the network switch unit comprising a control input for receiving a fault signal the hub having a third state: a failure state in which none of the network ports is connected to the switched port.

34. The network switch unit of claim 33, in which the control input is connected to the two-state hub so that a fault signal internal to the switch unit controls the two-state hub.

35. The network switch unit of claim 29, wherein the switch unit is modular and manually removable from an assembly of similar network switch units without disturbing any other network switch units or network connections.

36. The network switch unit of claim 35, in which the control input is connected to the two-state hub so that a fault signal internal to the switch unit controls the two-state hub.

* * * * *

UNITED STATES PATENT AND TRADEMARK OFFICE
CERTIFICATE OF CORRECTION

| | | |
|---|---|---|
| PATENT NO. | : 6,639,895 B1 | Page 1 of 1 |
| DATED | : October 28, 2003 | |
| INVENTOR(S) | : Helles et al. | |

It is certified that error appears in the above-identified patent and that said Letters Patent is hereby corrected as shown below:

<u>Column 14,</u>
Lines 43-45, reading:
"36. The network switch unit of claim 35, in which the control input is connected to the two-state hub so that a fault signal internal to the switch unit controls the two-state hub." should read:
-- 36. A fault tolerant network switch comprising:
    a plurality of network connectors;
    a first switcher having a first plurality of switched ports less than the number of network connectors;
    a second switcher having a second plurality of network ports less than the number of network connectors;
    a switchable coupler connecting the network connectors to the switched ports of the first and second switchers the coupler connecting each switched port to one network connector in a first mode, and connecting at least one switched port to a plurality of network connectors in a second mode; and
    a fault detector coupled to the first and second switchers and to the switchable coupler for detecting a fault in one of the first and second switchers and switching the switchable coupler to the second mode when a fault is detected. --

Signed and Sealed this

Tenth Day of February, 2004

JON W. DUDAS
*Acting Director of the United States Patent and Trademark Office*